United States Patent
Hussey et al.

(10) Patent No.: US 9,583,996 B2
(45) Date of Patent: Feb. 28, 2017

(54) ACTUATOR OVERSPEED GUARD

(71) Applicant: Nidec Motor Corporation, St. Louis, MO (US)

(72) Inventors: John H. Hussey, St. Louis, MO (US); Steven R. Palmer, Highland, IL (US); Jeffrey S. Sherman, Creve Coeur, MO (US); Mark Amalfitano, St. Louis, MO (US); Barry B. O'Brien, Florissant, MO (US); Mordechai Schwartz, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 486 days.

(21) Appl. No.: 14/168,541

(22) Filed: Jan. 30, 2014

(65) Prior Publication Data

US 2015/0214806 A1    Jul. 30, 2015

(51) Int. Cl.
*H02K 11/00* (2016.01)
*H01H 35/06* (2006.01)
*H01H 35/10* (2006.01)
*H02K 7/00* (2006.01)

(52) U.S. Cl.
CPC ............. *H02K 11/23* (2016.01); *H01H 35/06* (2013.01); *H01H 35/10* (2013.01); *H02K 7/003* (2013.01); *H02K 11/00* (2013.01); *Y10T 29/49009* (2015.01)

(58) Field of Classification Search
CPC ........ H02K 11/00; H02K 11/23; H02K 15/14; H02K 5/00; H01H 35/06; H01H 35/10; Y10T 29/49009
USPC ................ 310/68 E, 85, 89, 67 R; 200/80 R
See application file for complete search history.

(56) References Cited

U.S. PATENT DOCUMENTS

| 3,609,421 | A | 9/1971 | Hildebrandt |
| 6,181,037 | B1 | 1/2001 | Jones et al. |
| 6,201,325 | B1* | 3/2001 | Logsdon ................ H02K 11/23 |
| | | | 200/80 R |
| 6,215,214 | B1 | 4/2001 | Fisher et al. |
| 6,252,321 | B1 | 6/2001 | Fisher et al. |
| 6,710,478 | B1 | 3/2004 | Lewis et al. |

* cited by examiner

*Primary Examiner* — Michael Andrews
*Assistant Examiner* — Alexander Singh
(74) *Attorney, Agent, or Firm* — Maginot Moore & Beck LLP

(57) ABSTRACT

A location and retention component is provided for positively locating an overspeed guard and retaining a centrifugal actuator at an optimum positional relationship relative to each other. The system includes a first and second retention element removably engagable to the output shaft of a motor and axially fixable to the shaft at corresponding locations to maintain the optimum positional relationship. The first retention element serves as a positive stop for assembling the overspeed guard on the motor shaft, while the second retention element ensures that the centrifugal actuator is properly placed within the overspeed guard.

5 Claims, 4 Drawing Sheets

ACTUATOR OVERSPEED GUARD

FIELD

The present invention pertains to a centrifugal actuator for an electric motor having an overspeed guard. In particular, the present invention pertains to an overspeed guard for an electric motor centrifugal actuator in which the overspeed guard closely conforms to the peripheral contour of the component parts of the actuator and prevents the component parts from separating from the centrifugal actuator on overspeed of the actuator.

BACKGROUND

Electric motors having stators with separate start windings and run windings typically employ centrifugal actuators to control the energization of the two windings. The start winding is energized during start up of the motor, or when the speed of the motor falls below a specified operating speed, so as to create a rotating field in the motor stator and to apply sufficient torque to the motor rotor for starting purposes. However, once the motor has accelerated to a desired operating speed, or a pre-determined percentage of the desired operating speed, the rotor is able to follow the alternations of the magnetic field created by the run windings and the start winding is no longer needed. At this point in the motor's operation the centrifugal actuator automatically switches over energization of the start winding to the run winding.

Usually, the start winding is not intended for continuous use and may fail if not de-energized during normal operation of the motor. Conventionally, a switch referred to as a motor starting switch is provided in the motor for energizing the start winding only during start up of the motor and for de-energizing the start winding once the motor has attained its desired operating speed. A centrifugal actuator is typically employed in switching the motor windings between their start winding and run winding. The centrifugal actuator is mounted on the motor shaft for rotation with the shaft, and is responsive to the speed of the motor shaft for switching the windings between the start winding and the run winding, and vice versa.

A typical centrifugal actuator is disclosed in the U.S. Pat. No. 3,609,421, of Hildebrandt, issued Sep. 28, 1971, and assigned to the assignee of the present application and incorporated herein by reference. Basically, the centrifugal actuator includes a main body that is mounted to the electric motor shaft for rotation with the shaft. A sleeve is mounted on the main body for axially reciprocating movement of the sleeve over the main body between first and second positions of the sleeve relative to the shaft. The sleeve has an annular flange that projects radially outwardly from the sleeve. The annular flange is positioned on the shaft adjacent an electric switch. The switch completes a circuit through the start winding and the run winding of the motor in response to the sleeve moving between its respective first and second axially displaced positions on the shaft.

The sleeve and its annular flange are biased toward the first position of the sleeve on the shaft by a pair of springs. The springs extend transversely across opposite sides of the motor shaft and are connected between a pair of levers positioned on opposite sides of the motor shaft. The levers are mounted on the body of the actuator for pivoting movement of the levers relative to the body. Each of the levers is formed as bell cranks having one end connected to the sleeve and the opposite end connected to a weight mounted on the lever. Each of the levers has an intermediate projection that is received in a slot formed in opposite, radially outward portions of the actuator body. The projections engaging in the slots function as the pivot connections of the levers to the body. The pair of springs exert a biasing force on the levers pulling the weighed ends of the levers radially inwardly, and thereby bias the actuator sleeve toward its first position relative to the shaft.

When rotation of the shaft and the centrifugal actuator reaches a pre-determined speed, the centrifugal force exerted on the weighed ends of the levers causes the weighted ends to move radially outwardly against the bias of the pair of springs. This in turn causes the opposite ends of the levers engaging the actuator sleeve to move the sleeve from its first axial position relative to the shaft to its second axial position relative to the shaft. This movement of the sleeve and its annular flange automatically switches the windings of the stator from energization of the start winding to energization of the run winding of the motor. When the speed of rotation of the shaft falls below the pre-determined speed, the pair of springs pull the weighted ends of the levers radially inwardly, thereby causing the opposite ends of the levers to move the actuator sleeve from its second position relative to the shaft to its first position relative to the shaft. This in turn causes the annular flange of the actuator sleeve to switch the motor windings from energization of the run winding back to energization of the start winding.

Centrifugal actuators of the type described above and disclosed in the above referenced patent are relatively inexpensive to manufacture and, thus are employed on electric motors in many different applications. However, in some applications of electric motors their shafts are at times subjected to increased speeds over that possible by energizing the run winding of the motor, creating an overspeed condition in the centrifugal actuator.

One example of an operative environment in which an overspeed condition of the actuator can occur is in electric motors that drive augers used to transfer grain from one location to another. During operation, the drive augers may encounter resistance that generates a build-up of torsional tension in the motor shaft. In some cases, the drive auger may be stopped by an impediment, which in turn stops the rotation of the motor shaft. When the motor is turned off to free the auger, the torsional tension built up in the drive shaft will function as a torsion spring as it unwinds causing the motor shaft to spin in the opposite direction at an increased rate of speed above the running speed of the motor. This increased speed of rotation at times causes the centrifugal actuator mounted on the motor shaft to rotate at such a high rate of speed that the levers and springs will fly apart from the actuator body potentially damaging the electric motor and requiring replacement or repair of not only the centrifugal actuator, but also the electric motor.

Attempts at preventing this overspeed condition of the centrifugal actuator from damaging the electric motor have included the development of a plastic cup-shaped guard that is mounted on the motor shaft adjacent the centrifugal actuator with a cylindrical side wall of the guard surrounding the actuator. However, these prior art guards have required more complex tooling and assembly processes which results in higher production costs. What is needed is a lower cost overspeed guard that prevents component parts of the centrifugal actuator from separating from the actuator and potentially damaging the electric motor controlled by the actuator. In addition, certain overspeed guards cannot always be accurately mounted to the motor drive shaft. Success of the overspeed guard depends upon accurate placement of the guard so that the overspeed guard will properly interact with the centrifugal actuator.

SUMMARY

The present invention provides an overspeed protection system for a motor shaft including overspeed guard that is mounted on the shaft of an electric motor around the centrifugal actuator that controls the operation of the motor, in which the overspeed guard prevents component parts of the actuator from separating from the actuator during an overspeed condition. The system comprises a location and retention component for positively locating at least the overspeed guard at an optimum positional relationship relative to the centrifugal actuator to contain the centrifugal actuator in an overspeed condition. In one aspect, the location and retention component includes a first retention element removably engagable to the shaft and axially fixable to the shaft at a retention location on the shaft between the motor and the predetermined location, the first retention element configured to form a positive stop for the overspeed guard when it is axially mounted on the shaft, the retention location arranged relative to the predetermined location to obtain the optimum positional relationship.

In another aspect the location and retention component further includes a second retention element offset from the first retention element away from the motor. The second retention is positioned to abut the centrifugal actuator when the actuator is mounted on the shaft at its predetermined location. Both retention elements may include a groove defined in the shaft and a C-ring or snap ring engageable in the groove.

In a further aspect a method is provided for installing an overspeed protection system on a motor shaft in which the overspeed protection system includes a centrifugal actuator axially mountable at a predetermined location on the shaft for rotation with the shaft and an overspeed guard configured to be axially mountable on the shaft for rotation with the shaft and to substantially surround said centrifugal actuator in the radial direction to contain the centrifugal actuator in an overspeed condition. The method comprises engaging a retention element on the shaft and axially fixing the retention element at a second predetermined location on the shaft relative to the predetermined location and then disposing the overspeed guard on the shaft in abutment with the retention element. The centrifugal actuator is then disposed within the overspeed guard on the shaft at the predetermined location; and then a second retention element is engaged on the shaft in abutment with the centrifugal actuator to fix the axial location of the actuator on the shaft.

BRIEF DESCRIPTION OF THE DRAWINGS

Further features of the invention are revealed in the following detailed description of the preferred embodiment of the invention and in the drawing figures wherein.

Figure 1:
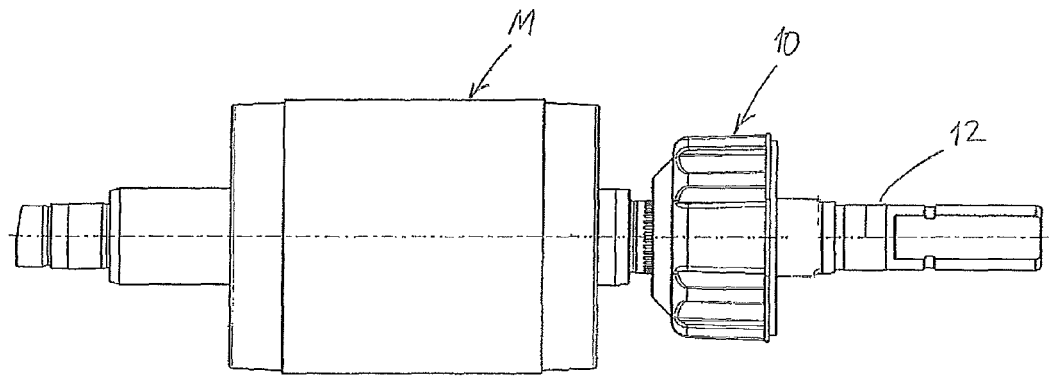
FIG. 1 is a side view of a prior art overspeed guard associated with a motor, motor drive shaft and centrifugal actuator.

2 is a cross-sectional view of the overspeed guard and the centrifugal actuator shown in FIG. 1.

Figure 2:
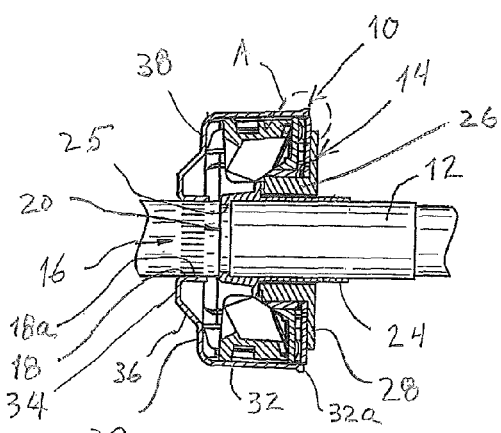
Figure 3:
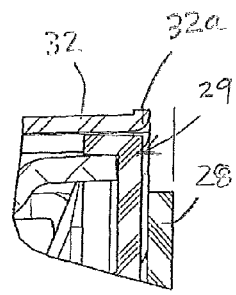

FIG. 3 is an enlarged cross-sectional view of region A in FIG. 2.

Figure 4:
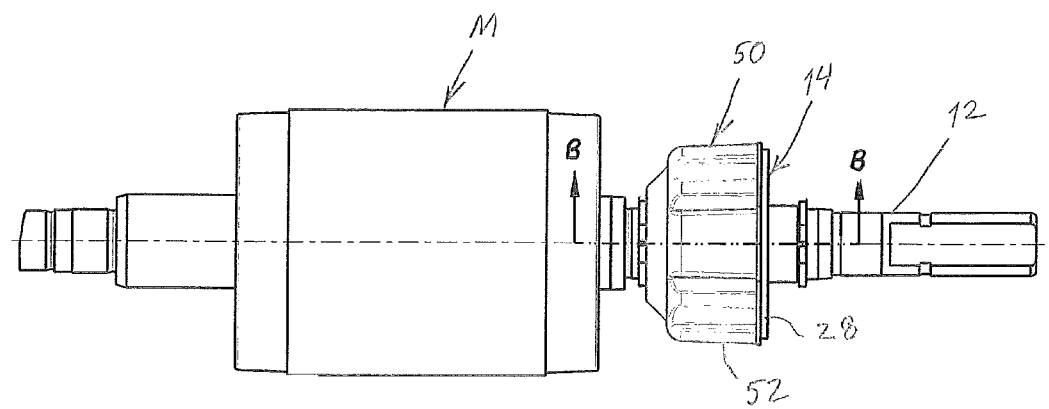

FIG. 4 is a side view of an overspeed guard according to the present invention associated with a motor, drive shaft and centrifugal actuator.

Figure 5:
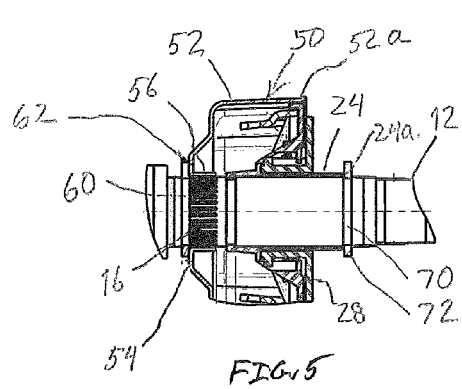

FIG. 5 is a cross-sectional view of the overspeed guard and actuator shown in FIG. 4.

Figure 6:
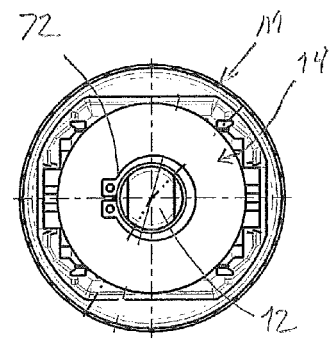

FIG. 6 is an end view of the overspeed guard and actuator shown in FIG. 4.

Figure 7:
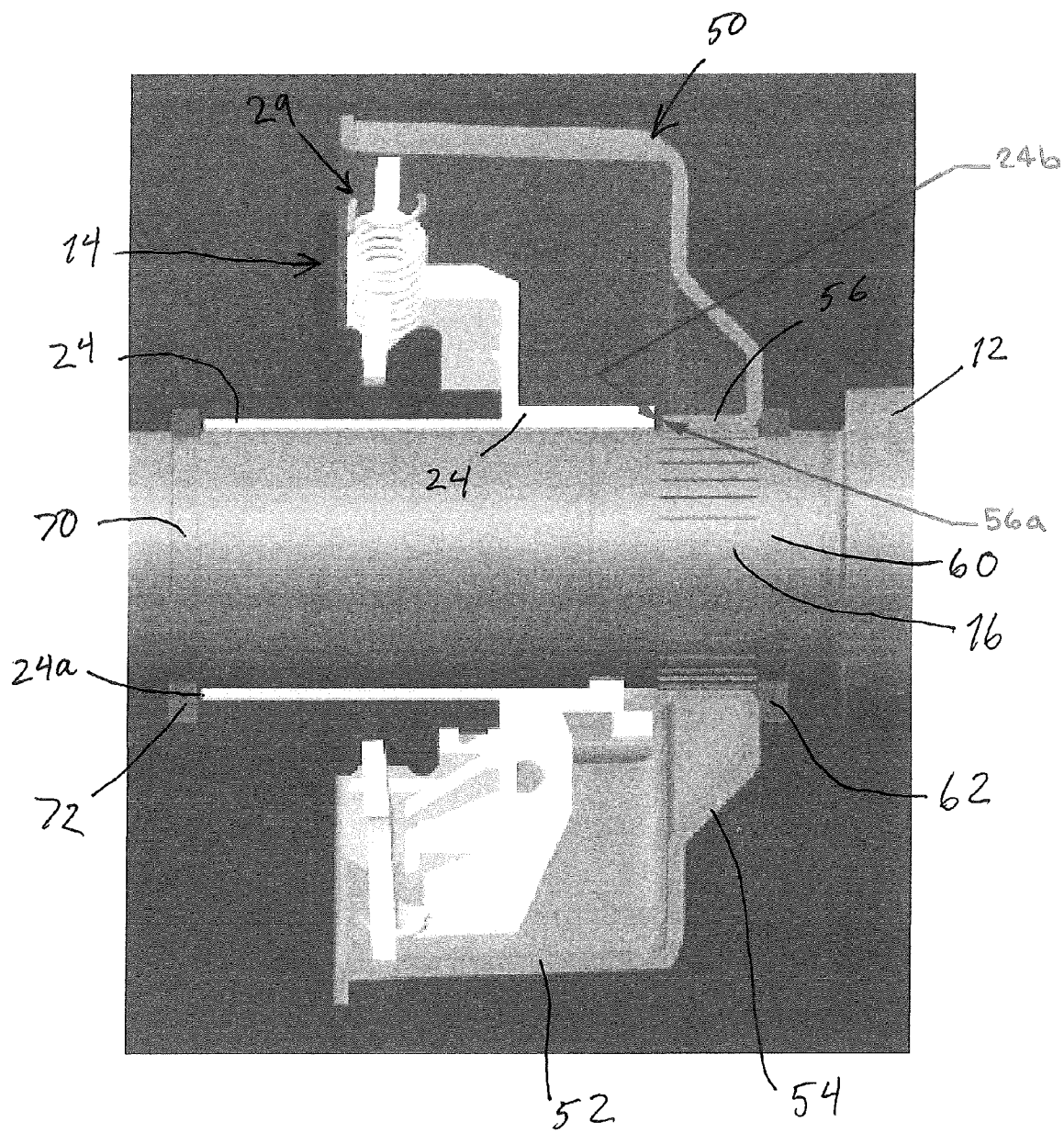

FIG. 7 is an additional cross-sectional view of the overspeed guard and actuator shown in FIG. 4.

Figure 8:
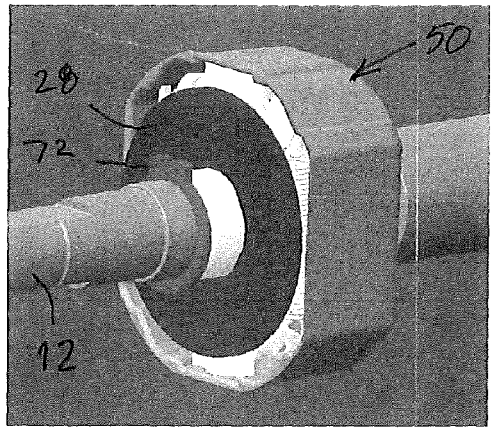

FIG. 8 is an end perspective view of the overspeed guard and actuator shown in FIG. 4.

Figure 9:
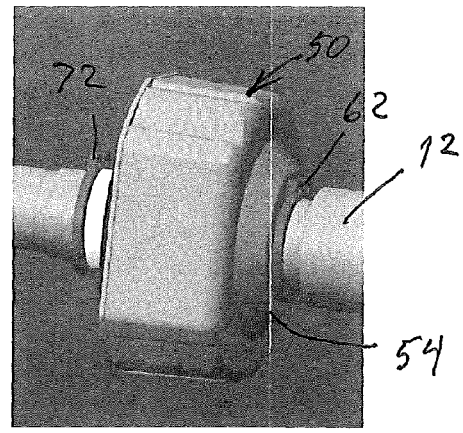

FIG. 9 is another end perspective view of the overspeed guard and actuator shown in FIG. 4.

Figure 10:
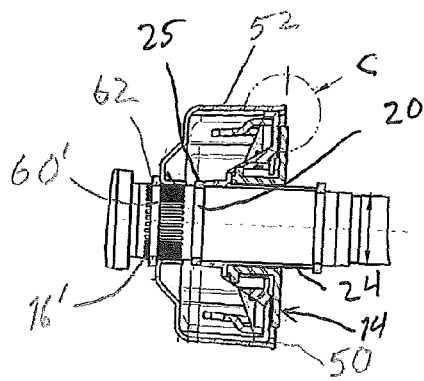

FIG. 10 is a cross-sectional view of an alternative overspeed guard.

Figure 11:
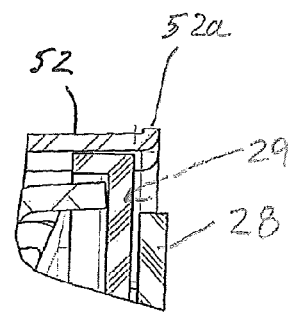

FIG. 11 is an enlarged view of region C in FIG. 10.

DETAILED DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

A prior art overspeed guard 10 coupled to the rotor shaft 12 of a motor M is depicted in FIGS. 1-3. A portion 16 of the rotor shaft 12 includes a plurality of knurls formed around the shaft and are configured for a tight friction fit with the inner surface 18a a cylindrical collar 18 of the overspeed guard 10. In addition, the shaft is provided with an annular groove 20 that extends around the shaft in a position on the shaft adjacent the knurled portion 16. The annular groove 20 is positioned on the shaft to maintain the centrifugal actuator 14 in its axial position on the shaft. In particular, the centrifugal actuator 14 includes a main cylindrical body 24 that is mounted on the shaft 12 for rotation with the shaft. The main body 24 includes an annular rim 25 that snaps into the annular groove 20 in the rotor shaft 12. The actuator 14 is slip fit over one end of the shaft 12 and is moved axially along the shaft until the annular rim 25 snaps into engagement with the shaft annular groove 20, thus properly positioning and securing the actuator on the shaft. However, in practice it has been found that it is difficult to verify that the actuator is properly positioned. The actuator 14 is mounted onto the shaft 12 using a blind press, so the operator must verify engagement by an audible click when the rim 25 snaps into the groove 20. However, in a typical installation environment it is very difficult to hear the click to verify proper installation.

The centrifugal actuator 14 includes a sleeve 26 is mounted on the main body 24 for axially reciprocating movement relative to the shaft. The sleeve 26 includes an annular flange 28 that projects radially outwardly from the sleeve. As the sleeve 26 and annular flange 28 reciprocate axially on the shaft, the flange operates the start winding and run winding switch (not shown) of the motor as explained above. An actuator mechanism 29 is disposed within the sleeve 26 and annular flange 28 and is configured for centrifugal operation as described above.

The overspeed guard 10 may be stamped as a single, monolithic piece from sheet metal. The guard includes the center cylindrical collar 18 described above, an annular end wall 30 and a side wall 32 projecting outwardly from the end wall 30 at an angle relative to the end wall. The annular end wall 30 extends radially outwardly from the cylindrical collar 18. A first portion 34 of the end wall extends radially outwardly from the collar 18 and is oriented perpendicular relative to the collar. A second portion 36 of the end wall then continues radially outwardly from the first portion 34 but tapers axially over the collar 18. A third portion 38 of the end wall then extends radially outwardly from the end wall second portion 36 and is also oriented perpendicular to the collar 18. The end wall third portion 38 extends radially outwardly to a perimeter edge of the side wall 32 of the guard. The axial taper of the end wall second portion 36 helps position the collar 18 of the guard outside of the end wall third portion 38 so that the collar 18 does not occupy any of the space within the guard side wall 32 that receives the centrifugal actuator 14 as shown in FIG. 2.

The side wall 32 extends axially from the end wall third portion 38 to a distal edge 32a with an axial length that is sufficiently long to accommodate or contain the centrifugal actuator 14 within the side wall 32. As shown in FIG. 3, the annular flange 28 of the actuator sleeve 26 is disposed beyond the distal edge 32a of the overspeed guard, but the centrifugal mechanism 29 is fully contained within the side wall 32. Because the configuration of the overspeed guard side wall 32 closely conforms to the exterior contour of the centrifugal actuator 14, should component parts of the actuator mechanism 29 over-extend from their intended range of movement during an overspeed condition their radial movement away from the rotor shaft 12 is limited by this small spacing. With the component parts of the actuator mechanism 29 being confined in the guard 10 and their radial movement away from the shaft being very limited, the guard 10 prevents the component parts of the actuator from completely separating from the actuator in an overspeed condition where the parts could potentially cause damage to the electric motor.

The prior art overspeed guard 10 shown in FIGS. 1-3 can be prone to mis-placement on the motor shaft 12 due to the difficulty in verifying proper installation as discussed above The notch 20 is arranged on the shaft 12 so that the centrifugal actuator 14 is in an optimum position to perform its protection function for the motor. The knurled portion 16 of the shaft is arranged so that the overspeed guard is in its optimum position to perform its function of containing the actuator. The knurled portion and notch are arranged to provide an optimum positional relationship between the guard and actuator, and secondarily to provide an optimum position of the guard-actuator combination relative to the motor. Thus, according to one aspect of the present invention, an overspeed guard 50 is provided for a conventional centrifugal actuator 14 as part of a location and retention component shown in FIGS. 4-9. The overspeed guard 50 may be configured similar to the guard 10 described above. In particular, the guard 50 includes a side wall 52 that envelops the centrifugal actuator 14 with the annular flange 28 exposed beyond the distal edge 52a. The side wall 52 is integral with an end wall 54 having a cylindrical collar 56 adapted for press-fit engagement with the knurled portion 16 of the motor shaft 12.

The overspeed guard 50 is thus far substantially similar to the guard 10. However, in one feature of the present invention, a retaining ring 62 is disposed within a retaining groove 60 formed in the motor shaft 12 at the end of the knurled portion 16, as best seen in FIG. 5. The end wall 54 of the overspeed guard 50 bears against the retaining ring 62. The retaining ring 62 thus provides a positive stop for properly positioning the overspeed guard on the motor shaft. To assemble the overspeed guard the user first engages the retaining ring 62 to the retaining groove 60 and then slides the overspeed guard 50 onto the shaft 12 until it is pressed against the retaining ring 62. The end wall 54 may be configured to extend from the side wall 52 by the same length as the end wall 34 of the prior art overspeed guard. On the other hand, the cylindrical collar 56 is preferably longer than the collar 18 of the prior guard. In one specific embodiment the cylindrical collar is about 0.02 in. longer than the prior art collar 18. This additional length reduces the relationship or gap between the interior end face 24b of the main body 24 and the interior end face 56a of the collar 56, as illustrated in FIG. 7. In one specific embodiment, the configuration of the collar 56 and main body 24 is such that the gap between the respective end faces 56a and 24b is less than about 0.05 in. and preferably about 0.028 in. The additional length of the collar, in combination with the positive stop of the retaining ring 62, further prevents the overspeed guard 50 from an "overpress" condition—i.e., being pressed too far onto the shaft 12. This positioning of the overspeed guard also prevents the centrifugal actuator 14 from being introduced on the shaft past the engagement notch 20 because the end 56a of the cylindrical collar acts as a positive stop for end 24b of the main cylindrical body 24 of the actuator 14.

Once the centrifugal actuator 14 has been mounted on the shaft 12 and positioned within the guard 50, a retaining ring 72 may be engaged within a retaining groove 70 defined in the shaft, as shown in FIG. 5. The end 24a of main body 24 of the actuator abuts the retaining ring 72 so that the actuator cannot be positioned too far outside the guard 50. The retaining ring 72 further prevents the actuator 14 from disengaging or "backing out" from the overspeed guard 50. The present invention thus contemplates a longer cylindrical collar 56 and two retaining rings 62 and 72 that provide positive stops for installation of both the overspeed guard 50 and the centrifugal actuator 14. The retaining rings 62 and 72 may be configured like the C-ring or snap-ring illustrated in FIG. 6. The C-rings are sized to seat within the corresponding grooves so that the C-rings are at fixed axially to the shaft. As is known, the C-rings or snap-rings can be elastically deformed for engagement on or removal from the grooves in the shaft. It is further contemplated that other forms of removable retaining elements may be utilized in lieu of the C-rings provided that the retaining element can be fixed axially on the shaft and can provide a positive axial stop for the overspeed guard and centrifugal actuator during all rotational speeds of the shaft.

The retaining rings 62, 72 and corresponding retaining grooves 60, 70 operate as a location and retention component for the overspeed guard 50 and the centrifugal actuator 14. The retaining ring 62 nearest the motor provides a positive stop for mounting both components on the drive shaft 12 of the motor. This positive stop feature prevents both the overspeed guard and the actuator from being pressed too far onto the shaft. The outboard retaining ring 72 helps retain the centrifugal actuator 14 on the shaft and also ensures that the actuator has been pressed far enough onto the shaft for optimum performance. The retaining rings and associated grooves provide this location and retention component in a compact space without requiring modification of the overspeed guard.

In an alternative embodiment, the retaining groove for the retaining ring 62 may be moved, as shown by the groove 60' in FIG. 10. In this embodiment, the retaining groove intersects the knurled portion 16' of the shaft 12. This position of the retaining ring 62 thus moves the positive stop for the overspeed guard 50 away from the motor, and toward the annular groove 20 that receives the annular rim 25 of the main cylindrical body 24, which in turn positions the centrifugal actuator 14. As shown in the detail view of FIG. 11, this repositioning of the overspeed guard causes the edge 52a of the side wall 52 of the guard to now overlap the annular flange 28 and to further recess the actuator mechanism 29 within the guard 50.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed:

1. An overspeed protection system for a drive motor comprising:
    a shaft coupled to the drive motor for rotation;
    a centrifugal actuator having a cylindrical body configured to be axially mountable at a predetermined location on the shaft for rotation with the shaft, the centrifugal actuator configured to control the drive motor in response to exceeding a rotational speed threshold;
    an overspeed guard having a cylindrical collar configured to be axially mountable on the shaft for rotation with the shaft, said overspeed guard configured to substantially surround said centrifugal actuator in the radial direction to contain the centrifugal actuator in an overspeed condition; and
    a location and retention component for positively locating at least the overspeed guard at an optimum positional relationship relative to the centrifugal actuator to contain the centrifugal actuator in an overspeed condition, wherein
    the cylindrical body of the centrifugal actuator includes a body end face and said cylindrical collar of the overspeed guard includes a collar end face facing said body end face of the cylindrical body of the centrifugal actuator, the cylindrical body and the cylindrical collar are mounted on the shaft with a gap between said body end face of the cylindrical body and said collar end face of the cylindrical collar that is less than about 0.05 inches.

2. The overspeed protection system of claim 1, the location and retention component further comprising:
    a first retention element removably engagable to the shaft and axially fixable to the shaft at a retention location on the shaft between the drive motor and said predetermined location, said first retention element configured to form a positive stop for the overspeed guard when it is axially mounted on the shaft, the retention location arranged relative to said predetermined location to obtain said optimum positional relationship.

3. The overspeed protection system of claim 2, the location and retention component further comprising:
    a second retention element offset from said first retention element away from the drive motor, said second retention element being positioned to abut the centrifugal actuator when the actuator is mounted on the shaft at said predetermined location.

4. The overspeed protection system of claim 3, said first retention element further comprising:
    a retention groove defined in said shaft; and
    a C-ring or snap ring configured to resiliently engage said shaft within said retention groove.

5. The overspeed protection system of claim 2, said first retention element further comprising:
    a retention groove defined in said shaft; and
    a C-ring or snap ring configured to resiliently engage said shaft within said retention groove.

* * * * *